(12) United States Patent
Jones et al.

(10) Patent No.: US 7,744,148 B2
(45) Date of Patent: Jun. 29, 2010

(54) ROTATABLE CAB WITH TOE GUARD

(75) Inventors: Jeremy A. Jones, Holly Springs, NC (US); Matthew J. Harrenstein, Sanford, NC (US)

(73) Assignee: Caterpillar SARL, Geneva (CH)

( * ) Notice: Subject to any disclaimer, the term of this patent is extended or adjusted under 35 U.S.C. 154(b) by 648 days.

(21) Appl. No.: 11/315,285

(22) Filed: Dec. 23, 2005

(65) Prior Publication Data
US 2007/0145779 A1 Jun. 28, 2007

(51) Int. Cl.
B62D 33/067 (2006.01)
(52) U.S. Cl. .............. 296/190.05; 296/190.03; 296/190.11; 180/89.14
(58) Field of Classification Search ............ 296/190.01, 296/190.03, 190.05, 190.08, 190.1, 190.11, 296/1.04; 180/89.12, 89.14, 89.15, 89.16, 180/89.18, 89.19, 90.6
See application file for complete search history.

(56) References Cited

U.S. PATENT DOCUMENTS

| | | | |
|---|---|---|---|
| 2,563,845 A | 8/1951 | Johnson | |
| 2,667,379 A | 1/1954 | Baze | |
| 3,278,222 A | 10/1966 | Mullet et al. | |
| 3,397,008 A | 8/1968 | Timmerman | |
| 3,924,524 A | 12/1975 | Whisler | |
| 4,055,262 A * | 10/1977 | Bauer et al. | 414/697 |
| 4,062,582 A | 12/1977 | Youmans | |
| 4,120,375 A * | 10/1978 | Shinoda et al. | 180/89.14 |
| 4,126,202 A | 11/1978 | Hern | |
| 4,408,672 A | 10/1983 | Albright et al. | |
| 4,427,090 A | 1/1984 | Fredriksen et al. | |
| 4,669,564 A | 6/1987 | Kreutz | |
| 4,669,565 A | 6/1987 | Miki et al. | |
| 4,695,342 A | 9/1987 | Belleau et al. | |
| 4,705,449 A | 11/1987 | Christianson et al. | |
| 4,739,853 A | 4/1988 | Ogilvie | |
| 4,962,825 A | 10/1990 | Albright et al. | |
| 5,024,283 A | 6/1991 | Deli | |
| 5,129,700 A | 7/1992 | Trevisan et al. | |
| D338,019 S | 8/1993 | Bhambra | |
| 5,273,340 A | 12/1993 | Nelson et al. | |
| 5,518,358 A | 5/1996 | Aschroft et al. | |
| 5,547,244 A | 8/1996 | Lee | |
| 5,551,826 A | 9/1996 | Todd et al. | |
| D394,069 S | 5/1998 | Muranen | |
| 5,941,330 A | 8/1999 | Miller et al. | |
| D419,568 S | 1/2000 | Baig et al. | |
| 6,016,584 A * | 1/2000 | Melroe | 15/78 |
| D423,521 S | 4/2000 | Walter et al. | |
| D424,778 S | 5/2000 | Dahl et al. | |

(Continued)

FOREIGN PATENT DOCUMENTS

EP 1325986 A1 7/2003

(Continued)

*Primary Examiner*—Jason S Morrow
(74) *Attorney, Agent, or Firm*—Finnegan, Henderson, Farabow, Garrett & Dunner

(57) ABSTRACT

A machine cab includes a cab frame, a floor portion, a seat portion disposed proximate the floor portion, a rear portion disposed proximate the seat portion, side panels connected to the frame, a roof portion, and a toe guard connected to the floor portion and extending forward of the cab frame.

14 Claims, 4 Drawing Sheets

U.S. PATENT DOCUMENTS

| | | | |
|---|---|---|---|
| 6,102,471 A | 8/2000 | Sasser et al. | |
| 6,189,954 B1 | 2/2001 | Martin, Jr. | |
| 6,257,645 B1 | 7/2001 | Kraimer et al. | |
| 6,357,820 B1 * | 3/2002 | Nagatsuka et al. | 296/190.06 |
| D455,763 S | 4/2002 | Brandenburg, III et al. | |
| 6,371,232 B1 | 4/2002 | Drake et al. | |
| 6,543,563 B1 | 4/2003 | Muraro | |
| 6,663,170 B1 | 12/2003 | Miga | |
| 6,729,031 B2 | 5/2004 | McKee | |
| 6,854,546 B2 | 2/2005 | Beckstrom | |
| 6,866,332 B2 | 3/2005 | Takeuchi et al. | |
| 6,910,731 B2 | 6/2005 | Albright et al. | |
| 2001/0008346 A1 * | 7/2001 | Martin, Jr. | 296/190.08 |
| 2002/0153748 A1 | 10/2002 | Sakyo et al. | |
| 2003/0042761 A1 | 3/2003 | Arthur et al. | |
| 2004/0040762 A1 * | 3/2004 | Beckstrom | 180/89.13 |
| 2004/0056513 A1 * | 3/2004 | Stone | 296/190.01 |
| 2004/0119320 A1 * | 6/2004 | Albright et al. | 296/190.05 |
| 2005/0012360 A1 * | 1/2005 | Richards et al. | 296/190.03 |
| 2005/0109773 A1 | 5/2005 | Penaloza et al. | |
| 2007/0145780 A1 | 6/2007 | Tecklenburg et al. | |

FOREIGN PATENT DOCUMENTS

| | | |
|---|---|---|
| EP | 1357019 | 10/2003 |
| JP | 3-239679 | 10/1991 |
| JP | 7-34486 | 2/1995 |
| JP | 10121520 | 5/1998 |
| JP | 2002/038525 | 2/2002 |

* cited by examiner

US 7,744,148 B2

ROTATABLE CAB WITH TOE GUARD

TECHNICAL FIELD

The present disclosure relates generally to a cab for a work machine, and more particularly, to a work machine having a rotatable cab including a toe guard.

BACKGROUND

In conventional work machines such as skid steer loaders, a top portion of the machine cab rotates forward or backward to allow access to the machine systems for servicing and maintenance. However, on such machines, the floor of the cab remains with the main machine body, while a top portion of the cab rotates. The portion of the cab surrounding the operator's legs, such as the floor, remains with the frame of the main machine body.

One method of providing access to a work machine's systems is described in U.S. Pat. No. 6,854,546 (the '546 patent) issued to Beckstrom. The '546 patent describes an auxiliary cab lift spring for rotatably moving a cab from a working position to a raised position.

Although the system of the '546 patent may rotatably move the cab, it fails to provide maximum access to the work machine's systems by integrating the cab floor to move with the machine cab during rotation. The disadvantages of this machine configuration are that it limits the size of the machine door for operator ingress and egress, hampers sealing of the cab for heating, air conditioning, and ventilation (HVAC), and limits access to the machine body by maintenance and service personnel.

The disclosed system is directed to overcoming one or more of the problems set forth above.

SUMMARY OF THE INVENTION

In one aspect, the present disclosure is directed to a machine cab, having a cab frame, a floor portion, a seat portion disposed proximate the floor portion, a rear portion disposed proximate the seat portion, side panels connected to the frame, a roof portion, and a toe guard connected to the floor portion and extending forward of the cab frame.

In another aspect, the present disclosure is directed to a skid steer loader, including a work body, a work tool, a work arm assembly linking the work tool to the work body, tilt cylinders disposed proximate the work tool and configured to orient the work tool, a fully enclosed and rotatably mounted cab coupled to the work body. The cab includes a toe guard located at a forward-most location of the cab.

In yet another aspect, the present disclosure is directed to a cab for a skid steer loader, including a cab frame, a floor portion, a seat portion disposed proximate the floor portion, a rear portion disposed proximate the seat portion, side panels connected to the frame, a roof portion, a toe guard connected to the floor portion and extending forward of the cab frame, and a door portion disposed above the toe guard. The cab frame, side panels, roof, seat, rear and floor portions, toe guard, and door portion form an enclosure.

DETAILED DESCRIPTION

Figure 1:
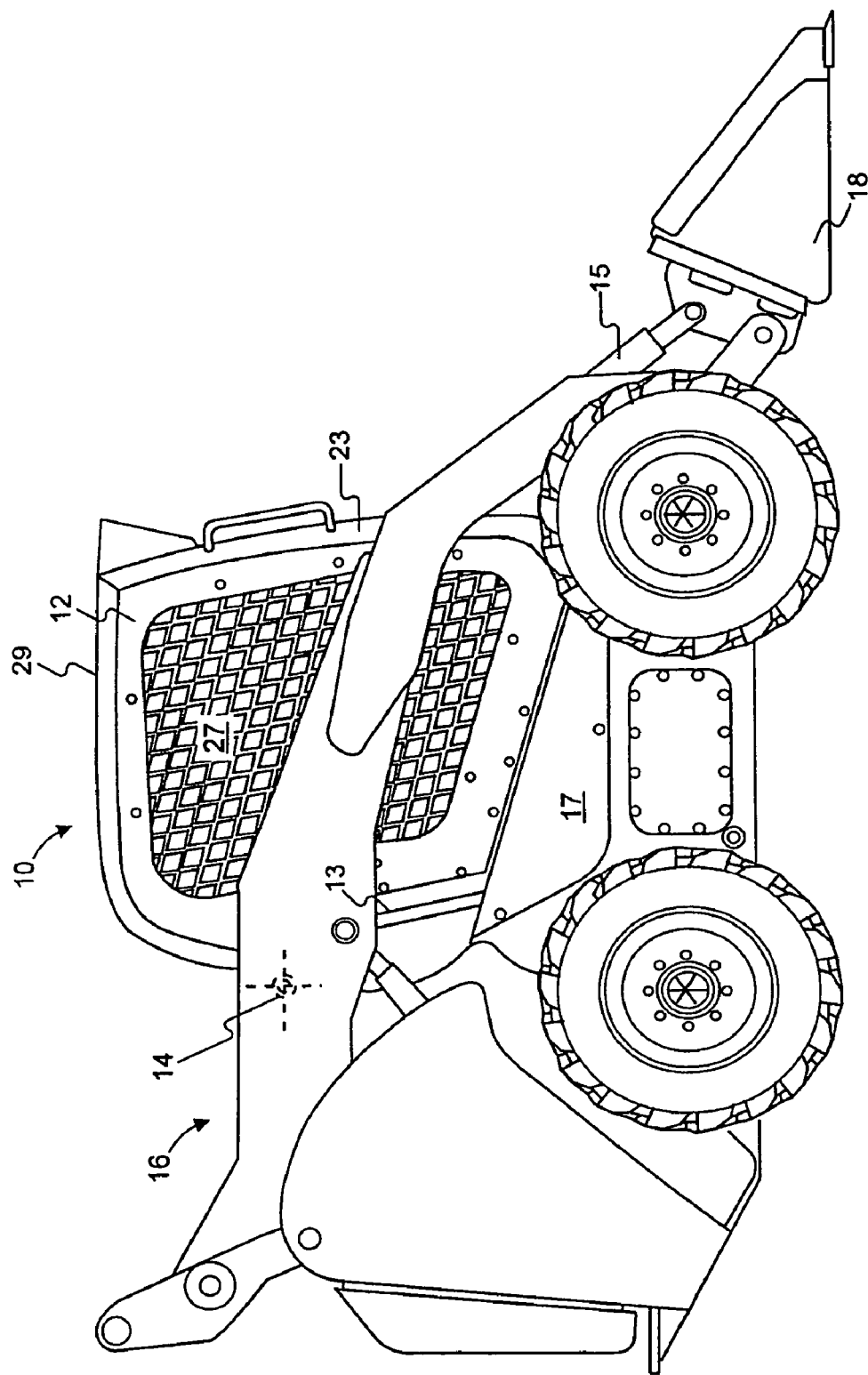
FIG. 1 is a side view of a work machine with an exemplary disclosed cab construction.

FIG. 1 illustrates an exemplary work machine 10 having multiple systems and components that cooperate to accomplish a task. Work machine 10 may embody a fixed or mobile machine that performs some type of operation associated with an industry such as mining, construction, farming, transportation, or any other industry known in the art. For example, work machine 10 may be an earth moving machine such as a skid steer loader, an excavator, a dozer, a loader, a backhoe loader, a motor grader, a dump truck, or any other earth moving machine. Work machine 10, shown in the form of a skid steer loader in the figures, may include a fully enclosed, rotatable machine cab 12 having side wall panels 27, cab lift cylinders 13, a cab pivot axis 14, tilt cylinders 15, a work arm assembly 16, a work body 17, and a work tool 18.

Figure 2:
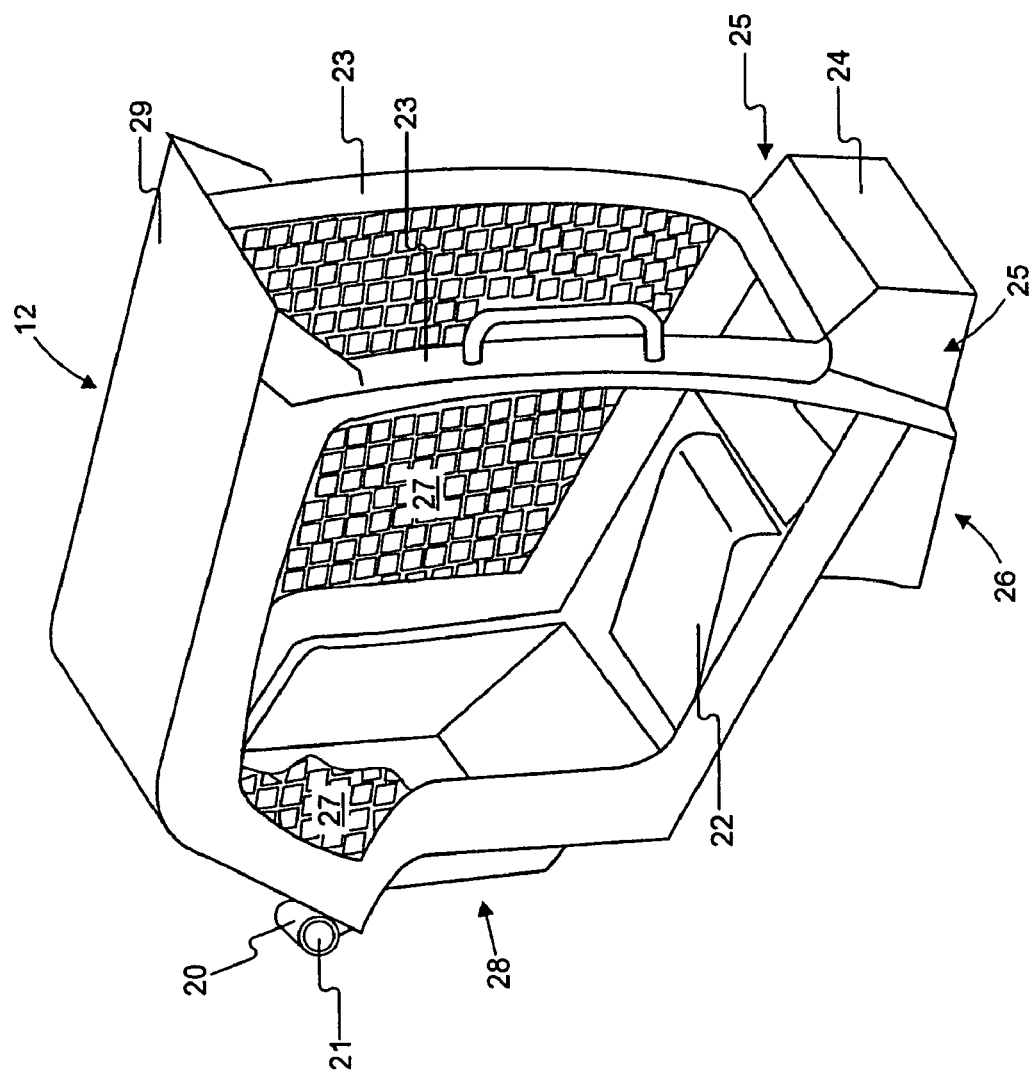
FIG. 2 is a perspective view of the cab of FIG. 1.
Figure 3:
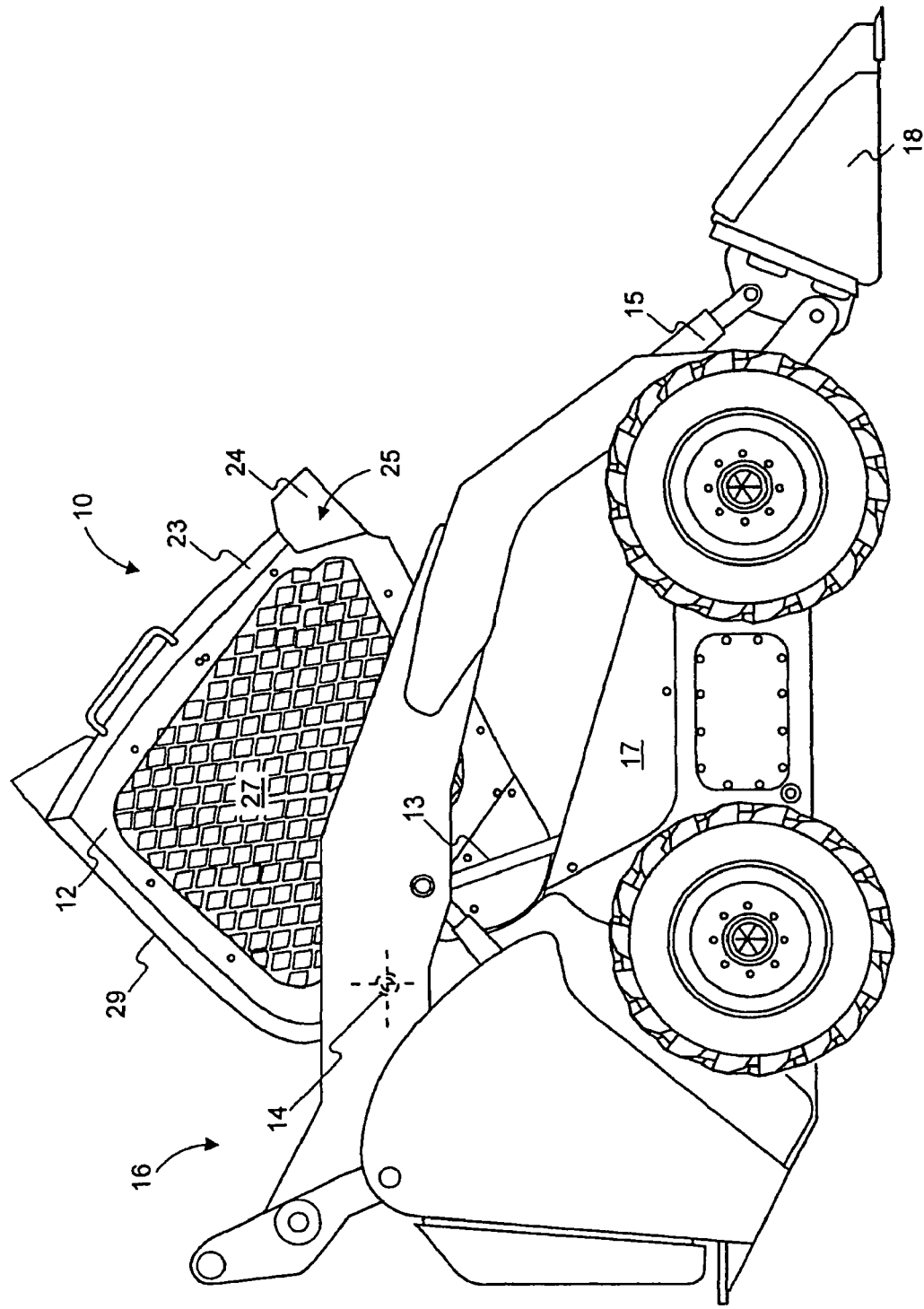
FIG. 3 is a side view of an exemplary disclosed rotated cab for the work machine of FIG. 1.

The fully enclosed, rotatable machine cab 12 is rotatably mounted to the work body 17 along pivot axis 14 using cab pivot mounts 20 as shown in FIG. 2. The fully enclosed, rotatable machine cab 12 may utilize cab lift cylinders 13 to move the machine cab 12 during rearward rotation as shown in FIG. 3. The lift cylinders 13 may be any type of lift cylinders, for example, hydraulic or pneumatic lift cylinders, and may be coupled between the work body 17 and machine cab 12 in any manner providing assistance in rotating the machine cab 12.

Alternatively, the fully enclosed, rotatable machine cab 12 may be tilted rearward by an operator using a tool (not shown). The machine cab 12 may be held in place by the lift cylinders 13 or by a conventional self-latching mechanism (not shown). When the cab is tilted back, numerous components of the work machine 10 are accessible. For example, the hydraulic pumps, hydraulic motors, engine valve lines and fuel tank may be accessible for quicker, easier service when the cab is rotated to its open position as shown in FIG. 3.

Referring back to FIG. 2, the fully enclosed, rotatable machine cab 12 may include front corner spaced portions 25 sculpted to allow rotation of the machine cab 12, regardless of the position the tilt cylinders 15 may occupy. The fully enclosed, rotatable machine cab 12 may include a floor portion 26, a rear portion 28, a seat portion 22, a support frame 23, side panels 27, and a roof portion 29. Moreover, the front of the machine cab 12 terminates in a toe guard 24 which is sized to accommodate the operator's feet during operation. The toe guard 24 rotates with the rest of the fully enclosed, rotatable machine cab 12. The rear portion 28 of machine cab 12 may include an HVAC box, electrical box, and the like, and may be made of non-metallic material.

The toe guard 24 extends forward of the remainder of the rotatable machine cab 12, and receives the operator's feet during operation of the work machine 10. The toe guard 24 does not extend across the entire width of the rotatable machine cab 12, instead the toe guard 24 terminates before reaching the outermost edges of the rotatable machine cab 12 as denoted by the front corner spaced portions 25. As its name implies, the toe guard 24 is intended to cover the feet of the operator, and does not extend upward to enclose the operator's knees or legs.

To accommodate the required space for rotation, the machine cab's support frame 23 terminates above the floor portion 26 of the rotatable machine cab 12. The rotatable machine cab 12 is sculpted to include the two spaced portions 25, located beneath support frame 23 to the sides of the toe guard 24. This arrangement allows the rotatable machine cab 12 to clear the tilt cylinders 15 during rearward rotational movement.

Referring to FIGS. 2 and 3, the rotatable machine cab 12 preferably includes a cab pivot mount 20 on its exterior having a pivot bore 21. With the cab mounts 20 at this location, service personnel can more easily free the rotatable machine cab 12 for rearward rotational movement as shown in FIG. 3, thereby easing maintenance operations and access.

Figure 4:
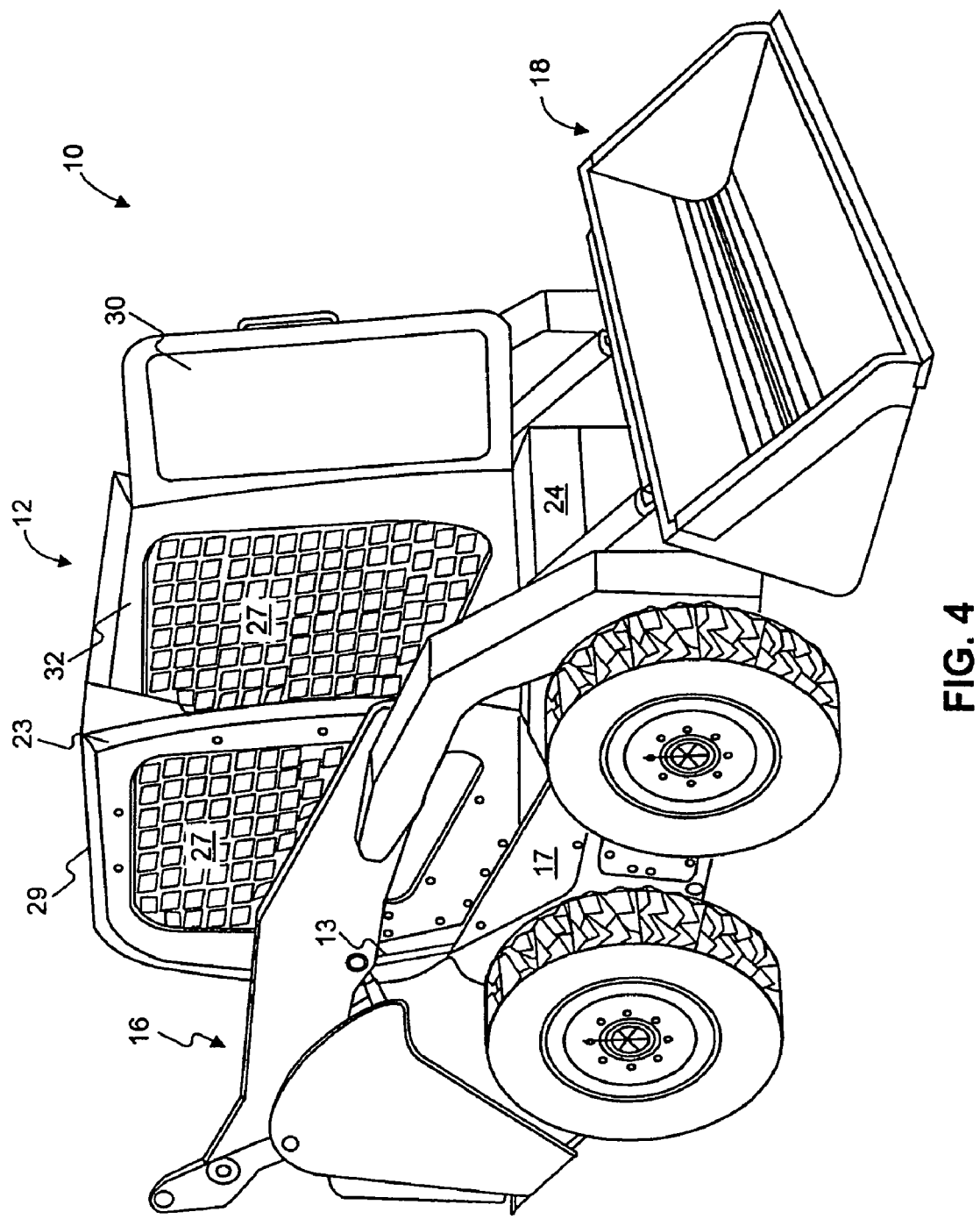
FIG. 4 is a perspective view of the work machine having an exemplary disclosed front access door for the cab of the work machine of FIG. 1.

Referring to FIG. 4, the front door 30 provided for operator ingress and egress extends from the top, front bar 32 of the rollover protection system to the toe guard 24. In this configuration, the fully enclosed, rotatable machine cab 12 has a door 30 larger than that of a conventional work machine. As described above, the toe guard 24 occupies less space than traditional structures serving the same purpose, as it is intended to surround only the operator's feet, instead of the operator's legs and feet. Thus, because the toe guard 24 occupies less vertical height than structures that surround the operator's legs in traditional work machines, the toe guard 24 allows for a larger ingress and egress door 30 for the operator. Moreover, because of the low height associated with the toe guard 24, the operator has to climb to a lower height to enter the rotatable machine cab 12 of the work machine 10 than in conventional machines. Further, including a larger door 30 increases visibility for the operator. The toe guard 24 in connection with the floor portion 26 may be made from any conventional material, for example, sheet metal. Toe guard 24 may provide a front step and door 30 sealing surface.

The toe guard 24 may also house the wash bottle (not shown), which holds windshield wiper fluid. Placing the wash bottle in the toe guard 24, instead of on the outside of the work machine 10 allows the operator easier access and enhanced visibility during operation of the work machine 10. Construction of the rotatable machine cab 12 may be of tubular steel for strength and formed from sheet metal and the like. The gussets in the corners of the rotatable machine cab 12 may include areas to mount lights or control panels (not shown).

An alternative embodiment may include a configuration allowing the fully enclosed, rotatable machine cab 12 to have forward rotational movement rather than the rearward rotational movement shown in FIG. 3. This configuration would allow for clearance of the toe guard 24 and have a pivot axis proximate toe guard 24.

INDUSTRIAL APPLICABILITY

The disclosed fully enclosed, rotatable machine cab 12 may be applicable to any work machine that includes a machine cab for an operator. The disclosed rotatable machine cab 12 may allow better access for maintenance personnel and may allow for a larger operator door. Moreover, improved sealing of the cab 12 may be obtained. The operation of the fully enclosed, rotatable machine cab 12 will now be explained.

During operation of work machine 10, the fully enclosed, rotatable machine cab 12 is in the closed position as shown in FIG. 1. The operator ingresses and egresses to the machine cab 12 may be through the front door 30 as shown in FIG. 4. The operator will sit on a seat located at the seat portion 22 and will operate the work machine 10 by controlling the work arm assembly 16, tilt cylinders 15, the work tool 18, and various other components of the work machine 10. The operator may also place his or her feet within the toe guard 24 during work operations for safety. The large front door 30 of work machine 10 allows for better visibility of the work area.

Upon exiting the work machine 10, the operator or other maintenance personnel may access the systems of the work machine by actuating cab lift cylinders 13 causing the fully enclosed, rotatable machine cab 12 to rotate in the rearward direction up and away from the work body 17 of the work machine 10. Thus, systems of the work machine 10 are accessible for any required repairs or upkeep. Upon completion of repairs or maintenance, the rotatable machine cab 12 is lowered back to its closed position and the operator may enter through the front door 30 and continue work operations.

Several advantages over the prior art may be associated with the fully enclosed, rotatable cab 12. The disclosed rotatable cab 12 may provide maintenance personnel with access for the easy servicing of work machine systems; may allow for a larger operator door 30 for easier ingress and egress, and may improve the sealing of the cab for heating, air conditioning, and ventilation purposes.

It will be apparent to those skilled in the art that various modifications and variations can be made to the disclosed fully enclosed, rotatable cab. Other embodiments will be apparent to those skilled in the art from consideration of the specification and practice of the disclosed fully enclosed, rotatable cab. It is intended that the specification and examples be considered as exemplary only, with a true scope being indicated by the following claims and their equivalents.

What is claimed is:

1. A machine cab, comprising:
    a cab frame connected to a floor, a seat, a rear, a roof, side panels, a front door and a toe guard;
    the floor disposed between the toe guard and the seat;
    the seat disposed between the floor and the rear;
    the front door disposed above the floor and toe guard, the toe guard disposed opposite the front door from the floor, the toe guard directly connected to the floor, the toe guard forming a forward extension of the cab frame beyond and below the front door; and
    wherein the machine cab is configured to be pivotably mounted to a frame of a machine.

2. The machine cab of claim 1, wherein the toe guard forms a bottom seal against the front door when the front door is in a closed position.

3. The machine cab of claim 1, wherein the front door extends from the roof to the toe guard.

4. The machine cab of claim 1, wherein the cab frame is formed of sheet metal.

5. The machine cab of claim 1, wherein the cab frame, side panels, roof, seat, rear ,floor, toe guard, and the front door together form an integral enclosure.

6. A skid steer loader, comprising:
    a body,
    a tool,
    an arm assembly linking the tool to the body,
    at least one tilt cylinder disposed proximate the tool and configured to orient the tool; and
    a fully enclosed integral and rotatably mounted cab coupled to the body, the cab including a cab frame connected to a floor, a rear, a roof, side panels, a front door and a toe guard, the floor disposed between the toe guard and the rear, the front door disposed above the floor and toe guard, the toe guard disposed opposite the front door from the floor, the toe guard forming a forward extension of the cab frame beyond and below the front door.

7. The skid steer loader of claim 6, including a plurality of tilt cylinders disposed on opposite sides of the cab.

8. The skid steer loader of claim 6, wherein the cab is configured for rearward rotation.

9. A cab for a machine, comprising:
a cab frame connected to a floor, a seat, a rear, a roof, side panels, a front door and a toe guard, the floor disposed between the toe guard and the rear, the front door disposed above the floor and toe guard, the toe guard disposed opposite the front door from the floor, the toe guard forming a forward extension of the cab frame beyond and below the front door; and
wherein the cab frame and toe guard are pivotably mounted to a frame of the machine.

10. The cab of claim 9, wherein the frame, side panels, roof, seat, rear, floor toe guard and front door form an enclosure.

11. The cab of claim 9, wherein the toe guard forms a bottom seal against the front door when the front door is in a closed position.

12. The cab of claim 9, wherein the front door extends from the roof portion to the toe guard.

13. The cab of claim 11, wherein the toe guard extends from the floor to the front door.

14. The cab of claim 9, wherein the cab frame is formed of sheet metal.

* * * * *